(12) United States Patent
Kitamura et al.

(10) Patent No.: US 7,491,957 B2
(45) Date of Patent: Feb. 17, 2009

(54) OPTICAL DISPLACEMENT SENSOR

(75) Inventors: Atsushi Kitamura, Nagano-ken (JP); Sawa Tanabe, Nagano-ken (JP); Shinya Suzuki, Nagano-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 99 days.

(21) Appl. No.: 11/580,762

(22) Filed: Oct. 13, 2006

(65) Prior Publication Data

US 2007/0097362 A1    May 3, 2007

(30) Foreign Application Priority Data

Nov. 2, 2005 (JP) ............................. 2005-319872

(51) Int. Cl.
  *G01N 21/86* (2006.01)
  *G01J 1/04* (2006.01)
(52) U.S. Cl. ............................. 250/559.32; 250/227.11
(58) Field of Classification Search ................... 341/11, 341/13; 250/231.13–231.18, 216, 559.29, 250/559.32, 227.11, 227.14, 227.2; 356/460, 356/482, 498
See application file for complete search history.

(56) References Cited

U.S. PATENT DOCUMENTS

| | | | |
|---|---|---|---|
| 6,768,129 B2 * | 7/2004 | Karasawa | 250/584 |
| 7,091,475 B2 * | 8/2006 | Tobiason | 250/231.16 |
| 2005/0116151 A1 | 6/2005 | Kitamura et al. | |

FOREIGN PATENT DOCUMENTS

JP    2005-156456    6/2005

* cited by examiner

*Primary Examiner*—Georgia Y Epps
*Assistant Examiner*—Pascal M Bui-Pho
(74) *Attorney, Agent, or Firm*—Fay Sharpe LLP

(57) ABSTRACT

An optical displacement sensor structure includes a plurality of light receiving elements and a plurality of optical fibers together with one light source, wherein light emitted from the one light source is efficiently introduced into the plurality of optical fibers from the circumferences of the optical fibers, well kept inside the optical fibers while transmitting therethrough, and exits out from the end face of one end portion of each optical fiber so as to impinge on each light receiving element. This structure, with only one light source, provides a plurality of optical displacement sensors thus reducing power consumption without suffering a problem of light loss and successfully enables downsizing.

12 Claims, 8 Drawing Sheets

OPTICAL DISPLACEMENT SENSOR

PRIORITY TO BE CLAIMED

This application claims priority from Japanese Patent Application No. 2005-319872, filed Nov. 2, 2005.

BACKGROUND OF THE INVENTION

1. Field of the Invention

The present invention relates to an optical displacement sensor and an external force detecting device, and more particularly to an optical displacement sensor to sense a relative positional displacement between a reference segment and a measurement segment according to the displacement of the position of light received, and an external force detecting device to detect an external force applied to the measurement segment according to the output of the optical displacement sensor.

2. Description of the Related Art

An external force detecting device, such as an optical six-axis force sensor, has been conventionally known, in which a positional displacement of a force receiving member (i.e., measurement segment) to receive an external force applied relative to a static member (i.e., reference segment) is sensed by an optical displacement sensor, and the external force applied is calculated according to a signal outputted from the optical displacement sensor.

For example, in an optical six-axis force sensor, an external force applied is calculated with respect to six axis directions according to displacements generated in the six directions, and therefore optical displacement sensors are provided so as to measure the displacements in the six axis directions. The optical six-axis force sensor as described above includes three optical displacement sensors each of which is adapted to measure displacements in the two axis directions X and Y.

Each of such optical displacement sensors includes a light emitting diode (LED) as a light source, and a photo diode (PD) array as a light receiving element disposed opposite to the LED on a common optical axis, wherein the PD array is composed of four PDs, and light emitted from the LED is arranged to impinge on the PD array at its center area equally shared by the four PDs. In the optical displacement sensor, the positional displacement of light received at the PD array can be detected, that is to say, the relative positional displacement between a portion of the sensor having the LED attached thereto and a portion of the sensor having the PD array attached thereto can be detected. In the optical six-axis force sensor, a six-axis force is calculated according to respective outputs from the three optical displacement sensors.

Conventionally, in a six-axis force sensor using three optical displacement sensors, a light source and a light receiving element must be provided at each optical displacement sensor thus requiring a plurality (three) of light sources, which results in increased power consumption. To overcome this problem, Japanese Patent Application Laid-Open No. 2005-156456 discloses a six-axis force sensor incorporating a trifurcate optical fiber which has one light entrance end and three light exit ends, and a light beam emitted from a light source is introduced into the trifurcate optical fiber from the one entrance end and split into three light beams to take three separate optical paths and to exit out from respective exit ends so as to impinge on three separate light receiving elements, respectively, thus requiring only one light source.

In the disclosed six-axis force sensor described above, the optical fiber has its trifurcated portions bent or curved at 90 degrees so that the three light beams progressing through the optical fiber can be duly directed to the respective light receiving elements. With this structure, there is a lot of light leaking at the bent/curved portion causing a problem of light loss. In order to reduce the amount of light leaking at the bent/curved portion, the curvature radius of the bent/curved portion must be set large, which, however, causes the optical displacement sensor to be dimensioned large, thus prohibiting downsizing of the sensor.

SUMMARY OF THE INVENTION

The present invention has been made in light of the above circumstances, and it is an object of the present invention to provide an optical displacement sensor structure which uses one light source, especially, for a plurality of light receiving elements, and which overcomes the problem of light loss while successfully enabling downsizing, and also to provide an external force detecting device incorporating such an optical displacement sensor structure.

In order to achieve the object, according to a first aspect of the present invention, there is provided an optical displacement sensor structure including: a reference segment and a measurement segment; one light source disposed at the reference segment (or the measurement segment); at least one light receiving element disposed at the measurement segment (or the reference segment) that does not have the one light source disposed thereat; and at least one optical fiber, wherein light emitted from the light source is introduced into the optical fiber from the circumferential surface of the optical fiber and exits out from the end face of one end portion of the optical fiber so as to proceed toward the light receiving element, whereby the light emitted from the light source is received by the light receiving element, and displacement of the measurement segment relative to the reference segment with regard to two axis directions in a plane perpendicular to the optical axis of the light emitted from the light source can be measured according to light receiving conditions. In the structure described above, the light emitted from the light source can be introduced efficiently into the optical fiber without suffering light loss.

In the first aspect of the present invention, the optical fiber may be wound to form a coil, the light source may be disposed to the central axis of the coil so that the light from the light source is introduced into the optical fiber from the inner circumference of the coil, and the end face of the one end portion of the optical fiber may be disposed so as to oppose the light receiving element. Since the inner circumference of the coil as a light entrance surface constitutes a large area, the light emitted from the light source can be introduced efficiently into the optical fiber. And, the structure described above enables downsizing.

In the first aspect of the present invention, a lens to condense the light from the optical fiber on the light receiving element may be disposed between the end face of the one end portion of the optical fiber and the light receiving element. Consequently, displacement can be detected with an enhanced accuracy.

In the first aspect of the present invention, the optical fiber may be a multimode optical fiber. Consequently, the light emitted from the light source can be introduced efficiently into the optical fiber.

In the first aspect of the present invention, the coil may have either a circular cylinder configuration, a truncated circular cone configuration, or a bowl configuration. With these coil configurations, the light emitted from the light source can be introduced further efficiently into the optical fiber while enabling downsizing.

In the first aspect of the present invention, a reflection element may be disposed at the outer circumference of the coil. Consequently, the light emitted from the light source can be introduced into the optical fiber also from the outer circumference of the coil thus increasing the light entrance surface, which results in that the light emitted from the light source can be further efficiently introduced into the optical fiber.

According to a second aspect of the present invention, there is provided an external force detecting device which includes an optical displacement sensor structure as described above, and in which an external force applied to the measurement segment is detected based on a signal resulting from measurement by the optical displacement sensor. Consequently, the external force detecting device enables efficient light utilization without suffering light loss.

In the second aspect of the present invention, the optical displacement sensor structure may include a plurality of light receiving elements and a plurality of optical fibers together with the one light source commonly shared thereby providing a plurality of optical displacement sensors, where two axis directions with respect to which each optical displacement sensor detects displacement are different from each other. With the one light source commonly shared in multiple optical displacement sensor, the external force detecting device enables downsizing.

DETAILED DESCRIPTION OF THE INVENTION

Exemplary embodiments of the present invention will hereinafter be described with reference to the accompanying drawings. The embodiments described below each refer to an optical displacement sensor applicable to an optical six-axis force sensor, but the present invention is not limited to the application for use in an external force detecting device to detect six-axis force and has general applicability.

Figure 1:
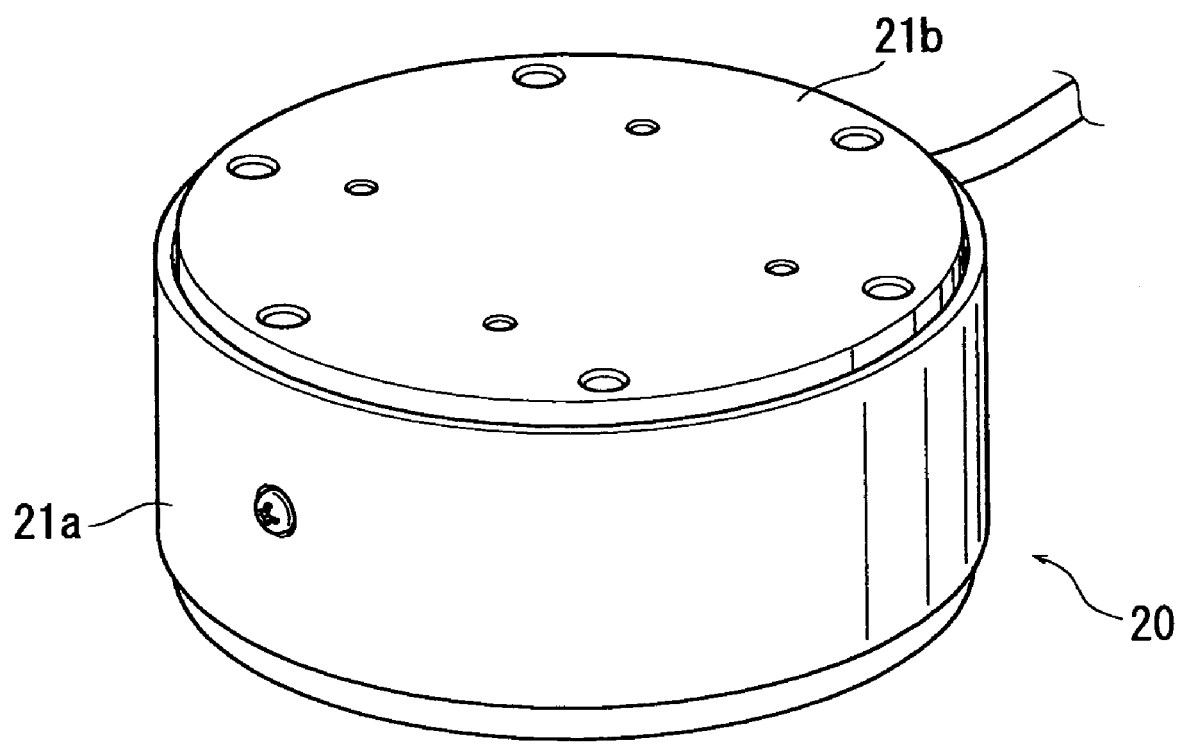
FIG. 1 is a perspective view of a six-axis force sensor according to a first embodiment of the present invention.

Referring to FIG. 1, a six-axis force sensor 20 according to a first embodiment of the present invention generally includes a main body 21a having a circular cylindrical configuration, a top lid 21b having a disk configuration, and a bottom lid (not shown).

Figure 2:
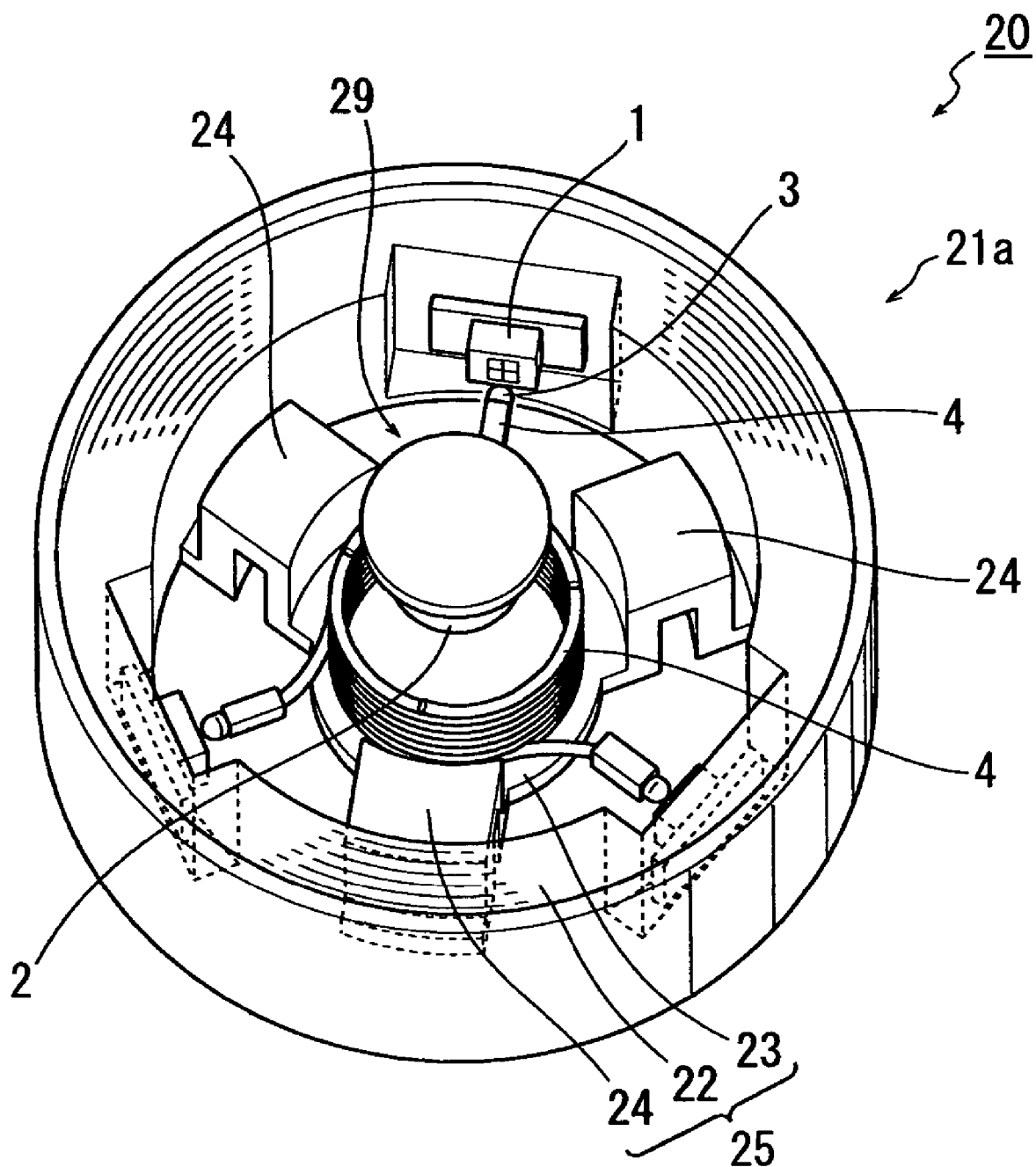
FIG. 2 is a perspective view of the six-axis force sensor of FIG. 1 with its top lid removed.
Figure 3:
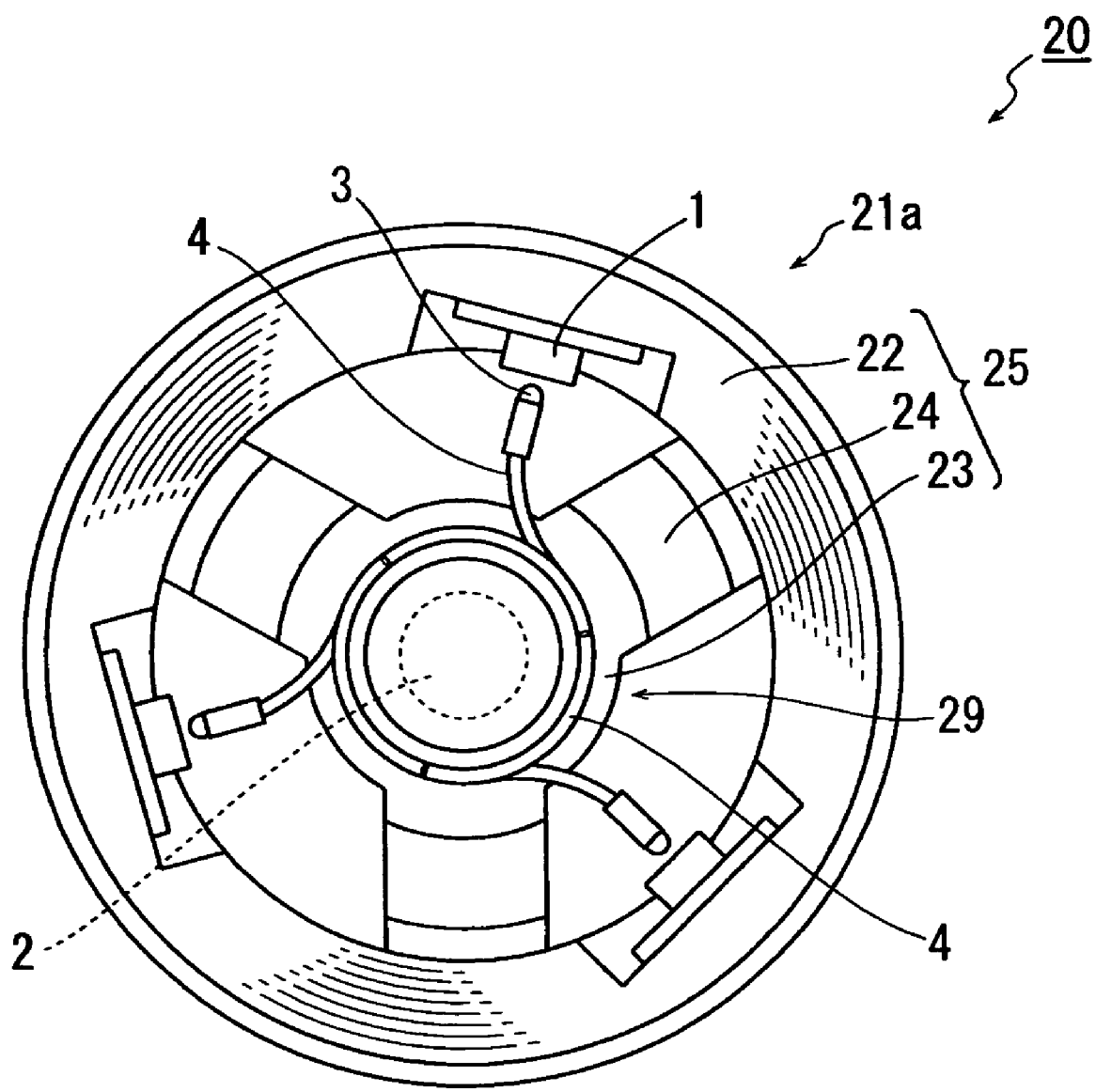
FIG. 3 is a top plan view of the six-axis force sensor of FIG. 2.

Referring to FIGS. 2 and 3 showing respectively perspective and top plan views of the six-axis force sensor 20 with the top lid 21b removed, the main body 21a is basically constituted by a frame 25 which integrally includes: a static member 22 with a hollow-circular cylindrical structure; an active member 23 disposed centrally inside the static member 22 and adapted to receive an external force; and three elastic spoke members 24 crookedly structured so as to readily provide elastic deformation in all directions and supportably bridging the active member 23 to the static member 22.

The frame 25 is made of a single piece of an aluminum alloy material and shaped by cutting and electric discharge machining. The static member 22 and the active member 23 are fixed respectively to two components to which a measurement force is applied, and when the applied force acts on the six-axis force sensor 20 structured as described above, micro-displacements with respect to three-axis directions and micro-rotations with respect to rotational directions thereabout are generated between the static member 22 and the active member 23.

In the present embodiment, the cylinder wall portion of the frame 25, i.e., the static member 22, functions as a reference segment while the center portion of the frame 25, i.e., the active member 23, functions as a measurement segment, but the present invention is not limited to this arrangement and it may be arranged such that the cylinder wall portion of the frame functions as a measurement segment and the center portion of the frame functions as a reference segment.

The static member 22 has three optical sensors 1 (light receiving elements each constituted, for example, by a PD array in the present embodiment) disposed at its inner circumference at 120 degree intervals (i.e. at an equiangular distance). The active member 23 has one light source 2 (for example, LED) fixedly attached thereto by means of a retaining member (not shown) so as to be disposed at its upper region of the main body 21a, and three optical fibers 4 wound into a coil which has a circular cylinder configuration as a whole, and which is disposed under the light source 2 such that first end portions of the three optical fibers 4 are positioned close to the light source 2, and such that second end portions thereof, which are positioned far from the light source 2, lead outward so that second end faces (hereinafter referred to as "light exit end face" as appropriate) of the second end portions face straight the respective three optical sensors 1 of the static member 22. A lens 3 is attached to each of the light exit end faces of the optical fibers 4. The lens 3 may be constituted, for example, by an aspheric resin lens and is preferably integrated with the optical fiber 4. On the other hand, a reflective member, such as a reflective film or a reflective paint, is attached or applied to each of first end faces of the optical fibers 4 so that light introduced into each optical fiber 4 and otherwise allowed to exit out from the first end face is reflected so as to travel back through the optical fiber 4 toward the second end portions thereof. The arrangement of the first and second end portions of the optical fibers 4 is not limited to what is described in the present embodiment but may be such that the first end portions are positioned far from the light source 2, and the second (light exit) end portions are positioned close to the light source 2. The optical fiber 4 is preferably a multimode optical fiber with a core diameter of 10 μm or larger.

As described above, the light exit end faces of the three optical fibers 4 are disposed so as to face straight the three optical sensors 1, respectively. Light emitted from the light source 2 is introduced into the three optical fibers 4 mostly from the inner circumferential surface of the coil, and light introduced in each optical fiber 4 exits out from the light exit end face of the optical fiber 4 via the lens 3 and impinges on the optical sensor 1 at its center. The lens 3 functions to focus the light exiting out the optical fiber 4 on the center of the optical sensor 1. Each of the optical sensors 1 and each of the optical fibers 4 with respective lenses 3 constitute, in combination with the light source 2, an optical sensor unit (i.e., optical displacement sensor) 29. In the six-axis force sensor 20 according to the present embodiment, an optical displacement sensor structure is constituted by three optical displacement sensors 29 which are composed of respective optical sensors 1 and respective optical fibers 4 with lenses 3 while sharing the one light source 2.

Figure 4A:
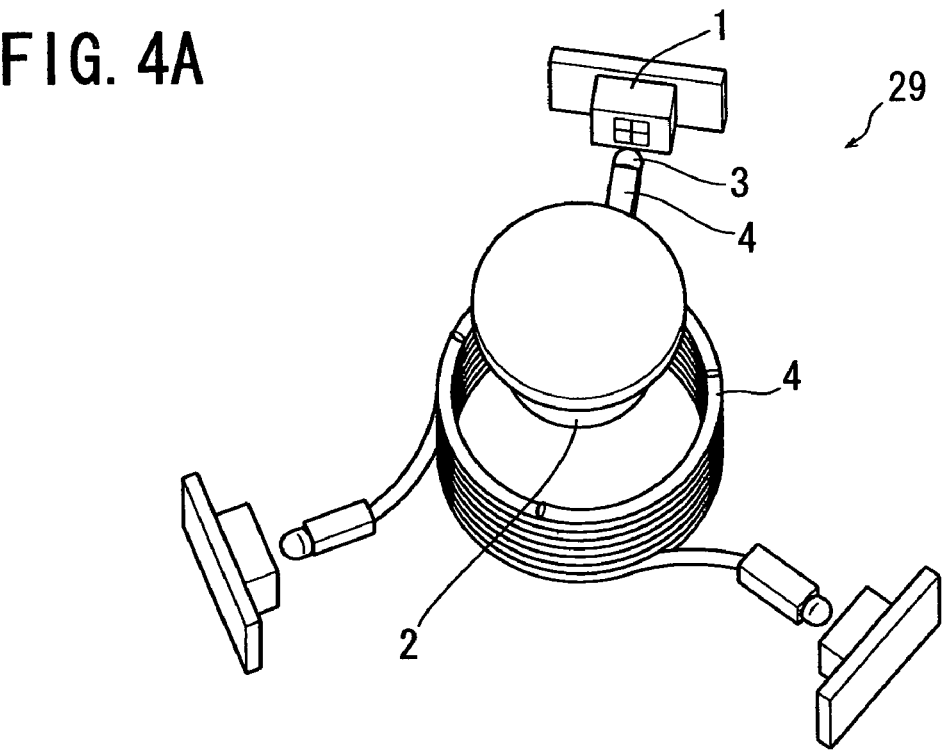
FIG. 4A is a perspective view of an optical displacement sensor structure shown in FIGS. 2 and 3.
Figure 4B:
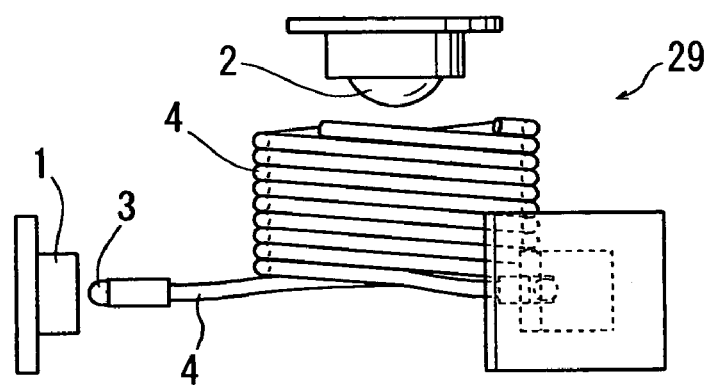
FIG. 4B is a side view of the optical displacement sensor structure of FIG. 4A.

Referring to FIGS. 4A and 4B, in the present embodiment, the optical displacement sensor structure constituted by the three optical displacement sensors 29 includes the three PD arrays (as the optical sensor, i.e., light receiving element) 1, the three optical fibers 4, the three lenses 3 each disposed at the light exit end face of the optical fibers 4, and the one LED (as the light source, i.e., light emitting element) 2 commonly shared. Light emitted from the LED 2 is introduced into the three optical fibers 4, and light introduced in each optical fiber 4 exits out from the light exit end face thereof via the lens 3 so as to be emitted as a light beam 5 (refer to FIG. 4C) impinging on each PD array 1 at its center. In this connection, the distance from the lens 3 to the light receiving face of the PD array 1 is set at, for example, 0.5 mm. The coil formed by the optical fibers 4 wound is mounted on the active member 23, which functions as a reflector plate.

In each of the optical displacement sensors 29 constituting the optical displacement sensor structure described above, the PD array 1 is disposed at the static member 22 (reference segment) so as to receive the light beam 5 which originally comes from the LED 2 and exits out from the optical fiber 4 via the lens 3, wherein the displacement of the measurement segment relative to the reference segment can be measured according to the light receiving condition with respect to two axis directions in the plane orthogonal to the optical axis of the light beam 5 emitted from each optical fiber 4.

Figure 4C:
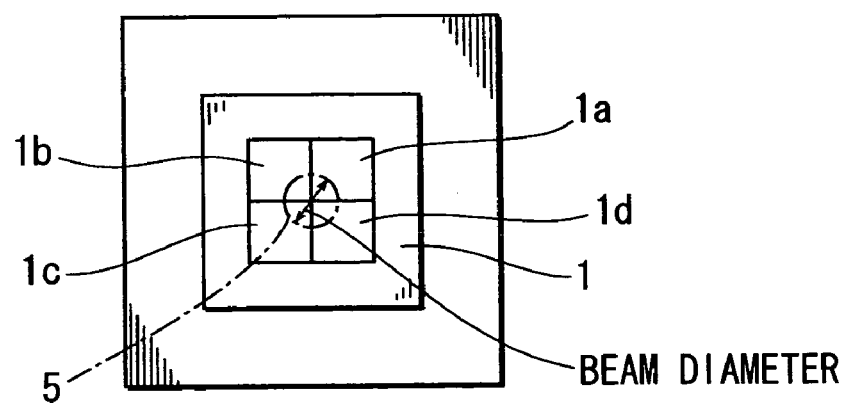
FIG. 4C is a front view of a light receiving face of an optical sensor shown in FIGS. 4A and 4B.

Referring to FIG. 4C, the PD array 1 has four PDs 1a, 1b, 1c and 1d (constituting a light receiving element) arranged at its light receiving face, on which the light beam 5 originally emitted from the LED 2 and exiting out from the optical fiber 4 via the lens 3 falls incident. It is preferred that the optical axis of the light beam 5 be perpendicular to the light receiving face of the PD array 1, and that the center of the light beam 5 correspond to the center of the light receiving face which is defined by the intersection of the boundary lines formed with the four PDs 1a to 1d. The displacement of the measurement segment relative to the reference segment is measured according to the variation in the amount of light received at respective PDs 1a to 1d.

Figure 5A:
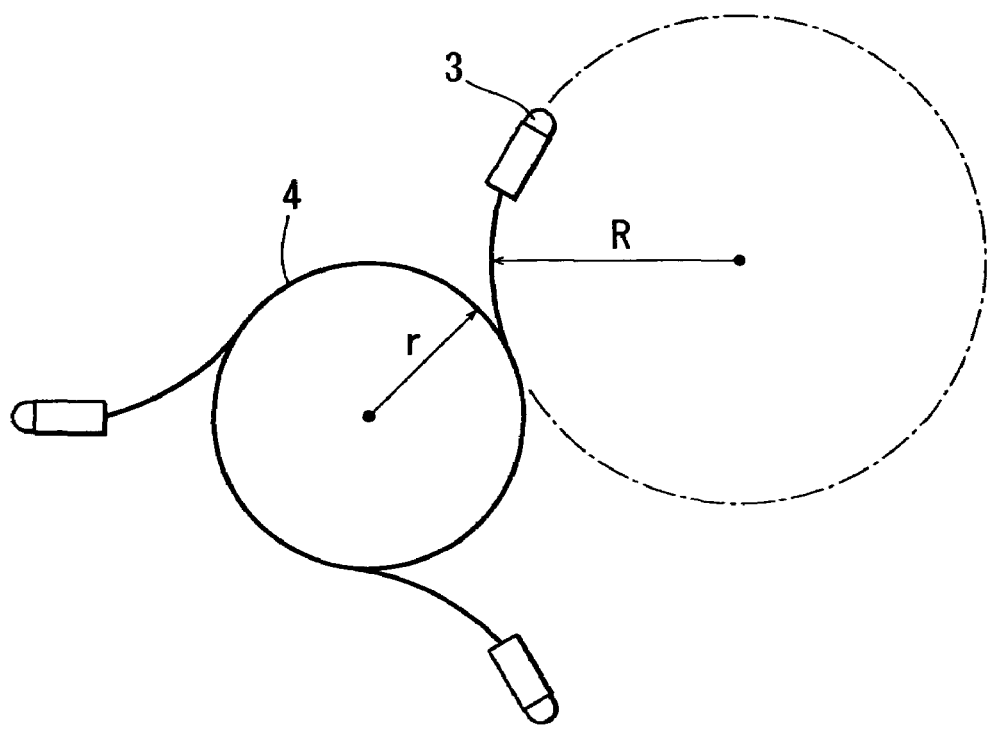
FIG. 5A is an explanatory view of curvature radii of an optical fiber.
Figure 5B:
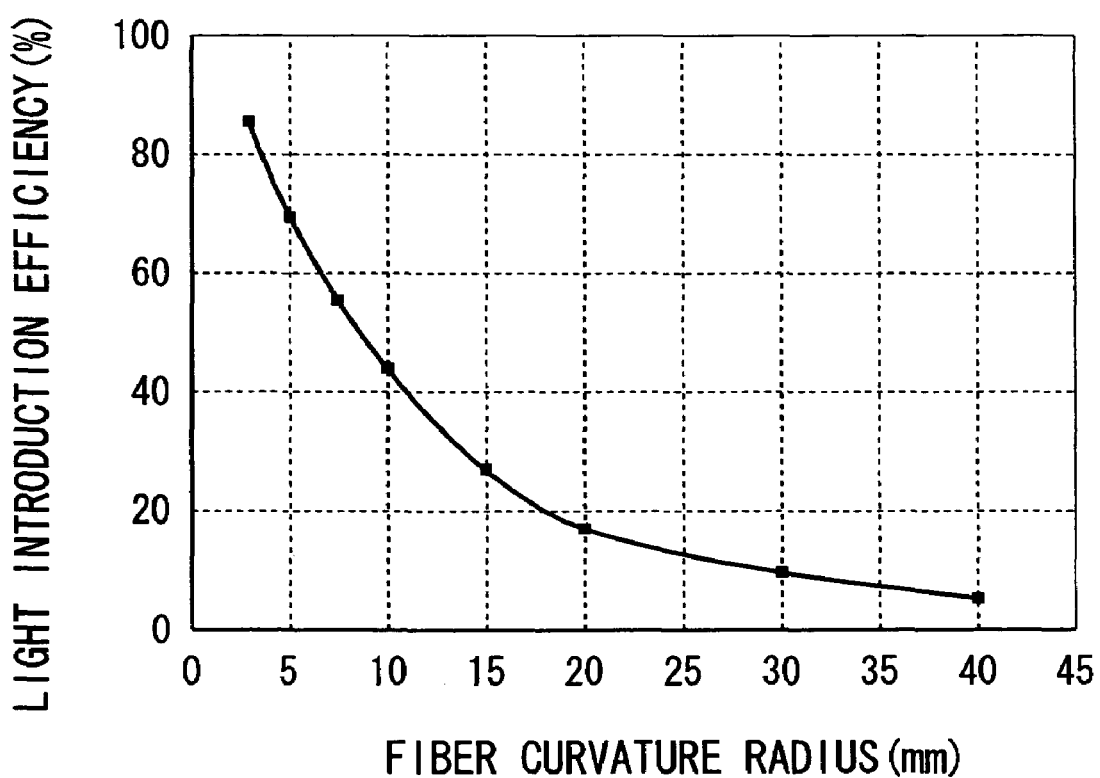
FIG. 5B is a graph of light introduction efficiency varying as a function of curvature radius of the optical fiber.

Description will be made on the principle on which light emitted from the LED 2 is introduced into the optical fibers 4. When an optical fiber is bent or curved, light transmitting in the optical fiber tends to partly leak from the optical fiber at the bent/curved portion, and at the same time, light outside the optical fiber tends to be introduced into the optical fiber from the bent/curved portion. In the present embodiment, the optical fibers 4 are arranged as shown in FIG. 5A, that is, the optical fibers 4 are wound into a coil with a curvature radius of r, and have their light exit end portions looped with a curvature radius of R. Referring now to FIG. 5B, it is shown that light introduction efficiency increases with a decrease of the curvature radius r, and, though not shown, this relation applies also to light leakage such that leakage coefficient increases with a decrease of the curvature radius R, which can be put differently that leakage coefficient decreases with an increase of the curvature R. Accordingly, light emitted from the LED 2 can be efficiently introduced into the optical fibers 4 with the curvature radius r set at, for example, 10 mm or smaller, and leakage of light transmitting in each optical fiber 4 can be held down with the curvature radius R set at, for example, 20 mm or larger.

Figure 6A:
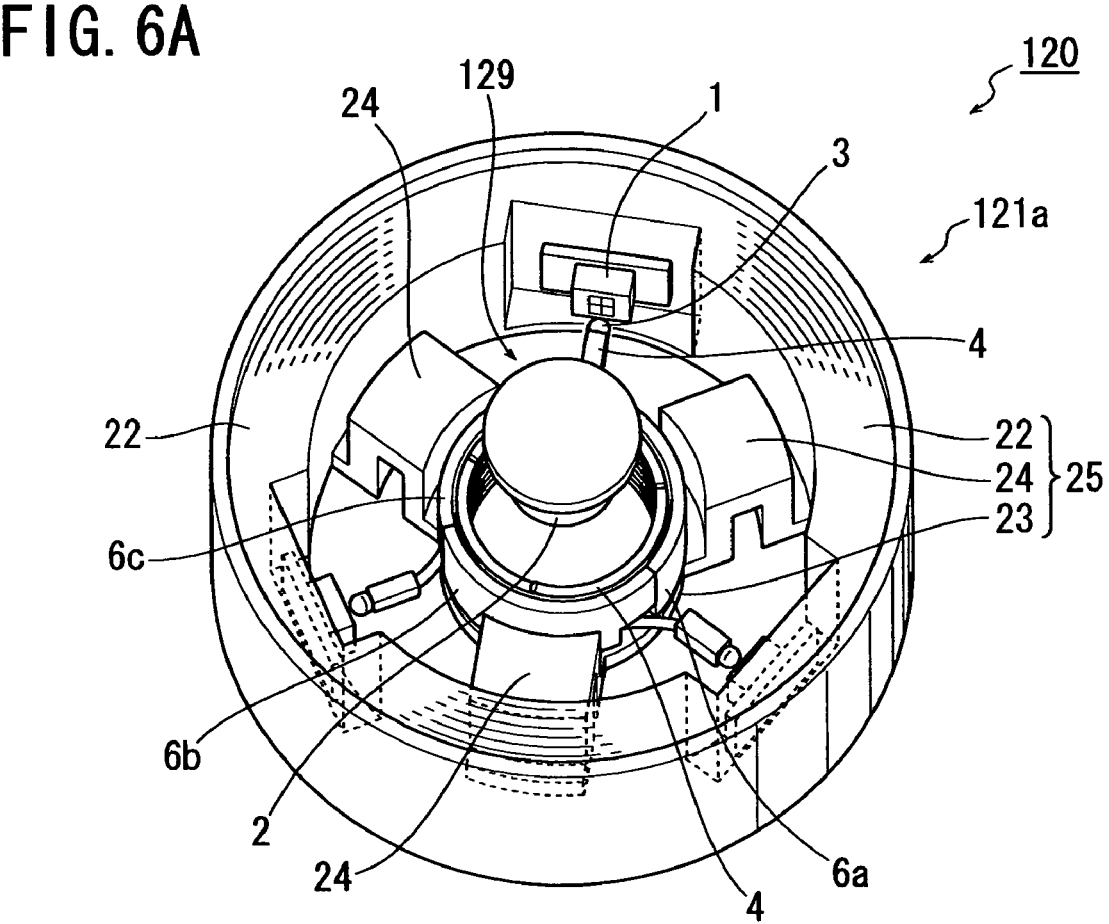
FIG. 6A is a perspective view of a six-axis force sensor with its top lid removed according to a second embodiment of the present invention.
Figure 6B:
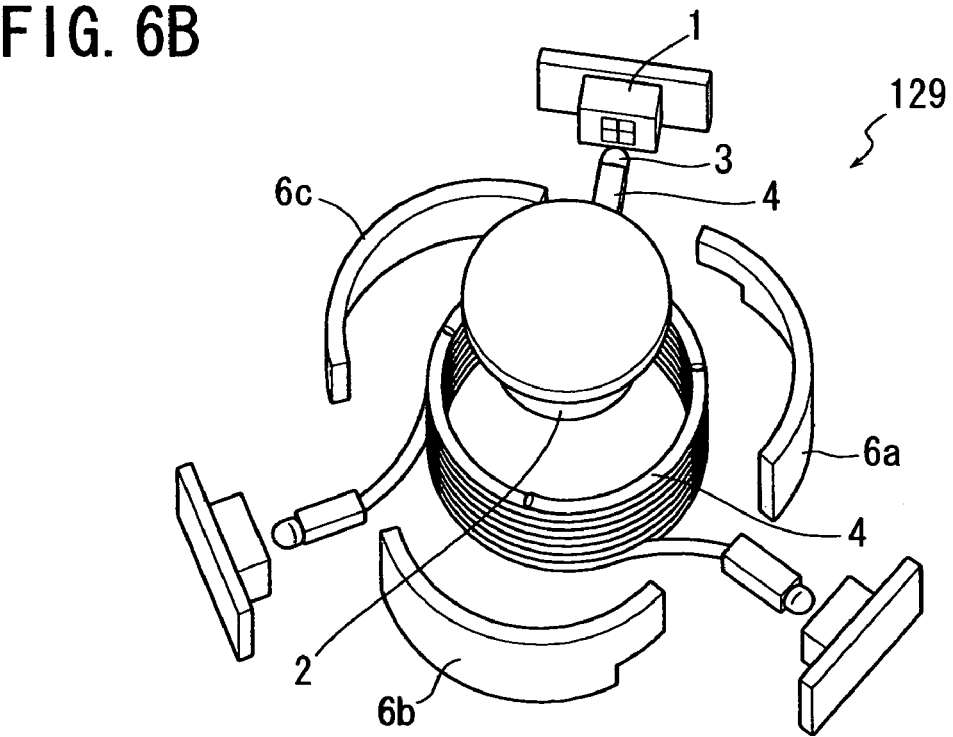
FIG. 6B is a perspective view of an optical displacement sensor structure shown in FIG. 6A.

Referring to FIG. 6A, in a six-axis force sensor 120 (with its top lid removed) according to a second embodiment of the present invention, a main body 121a is structured identical with the main body 21a of the six-axis force sensor 20 according to the first embodiment except that, as explanatorily shown in FIG. 6B, three reflective films 6a, 6b and 6c as a reflection element are provided at the outer circumference of a coil formed by three optical fibers 4. Thus, in the six-axis force sensor 120 according to the second embodiment, an optical displacement sensor structure is constituted by three optical sensor units (optical displacement sensors) 129 which are constituted by three optical sensors 1, the aforementioned three optical fibers 4 each having a lens 3 disposed at its light exit end face, and one light source 2 (commonly shared), and further includes the reflective films 6a, 6b and 6c described above. At least one surface of each reflective film 6a/6b/6c, that faces the coil of the optical fibers 4, has reflection property. The reflective films 6a, 6b and 6c shown in FIGS. 6A and 6B are discrete components, but may alternatively be structured as one component. The reflective films 6a, 6b and 6c may be a thin film, such as silver or aluminum film.

With the reflective films 6a, 6b and 6c provided at the outer circumference of the coil of the optical fibers 4, light that is emitted from the light source 2 but not successfully introduced into the optical fibers 4 from the inner circumference of the coil is reflected by the reflective films 6a, 6b and 6c so as to be introduced into the optical fibers 4 from the outer circumference of the coil. Also, with this structure, light once introduced into the optical fibers 4 is prevented from leaking out uselessly from the outer circumference of the coil. Thus, light emitted from the light source 2 can be efficiently introduced into and successfully kept within the optical fibers 4. If the reflection surfaces of the reflective films 6a, 6b and 6c is appropriately roughened, then the effect is further enhanced.

Figure 7A:
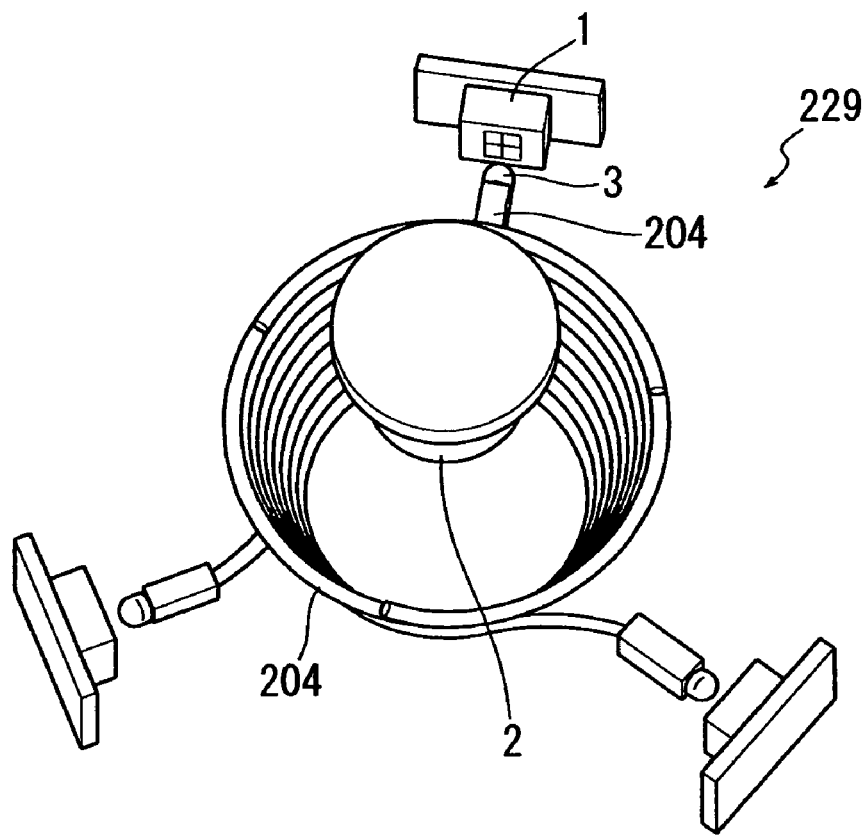
FIG. 7A is a perspective view of an optical displacement sensor structure incorporated in a six-axis force sensor (not shown) according to a third embodiment of the present invention.
Figure 7B:
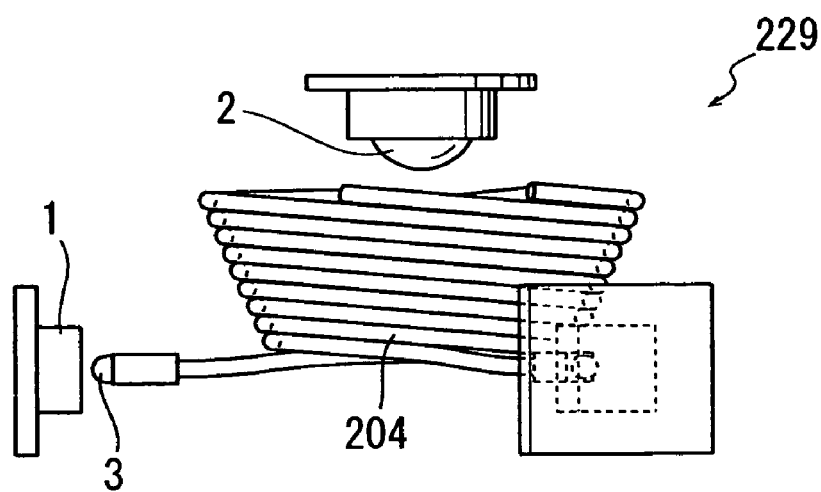
FIG. 7B is a side view of the optical displacement sensor structure of FIG. 7A.

Referring to FIGS. 7A and 7B, an optical displacement sensor structure incorporated in a six-axis force sensor (not illustrated) according to a third embodiment of the present invention is constituted by three optical displacement sensors 229 and differs from the optical displacement sensor structure incorporated in the six-axis force sensor 20 according to the first embodiment in that three optical fibers 204 are wound so as to form a coil which has a truncated circular cone configuration defining a diameter measuring larger at a portion close to a light source 2 than at a portion far from the light source 2. In the structure described above, light emitted from the light source 2 can be efficiently introduced into the optical fibers 204, and can be further efficiently introduced if a reflection element (for example, reflective films 6a, 6b and 6c described in the second embodiment) is provided at the outer circumference of the coil of the optical fibers 204.

Figure 8A:
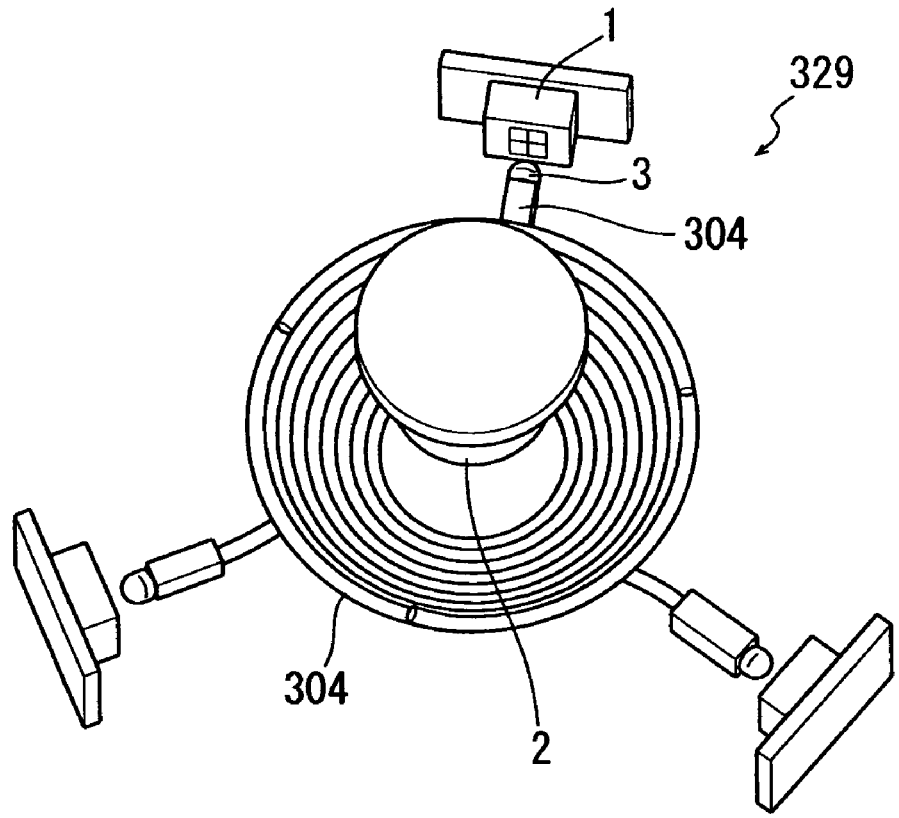
FIG. 8A is a perspective view of an optical displacement sensor structure incorporated in a six-axis force sensor (not shown) according to a fourth embodiment of the present invention.
Figure 8B:
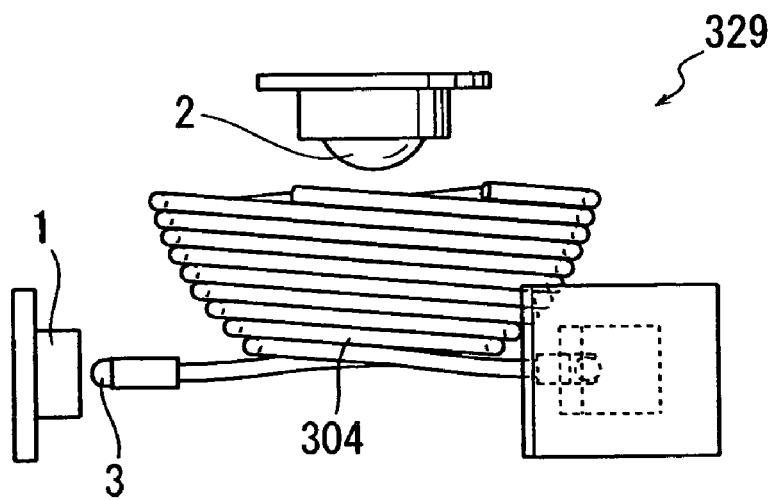
FIG. 8B is a side view of the optical displacement sensor structure of FIG. 8A.

Referring to FIGS. 8A and 8B, an optical displacement sensor structure incorporated in a six-axis force sensor (not illustrated) according to a fourth embodiment of the present invention is constituted by three optical displacement sensors 329 and is similar to the optical displacement sensor structure incorporated in the six-axis force sensor according to the third embodiment but differs therefrom in that three optical fibers 304 are wound so as to form a coil which has, instead of a truncated circular cone configuration, a bowl configuration defining a diameter measuring smaller with an increase in distance from a light source 2. In the structure described above, light emitted from the light source 2 can be efficiently introduced into the optical fibers, and can be further efficiently introduced if a reflection element (for example, reflective films 6a, 6b and 6c described in the second embodiment) is provided at the outer circumference of the coil of the optical fibers 304.

The optical displacement sensor structures exemplified above are suitable for providing multiple (three in the embodiments) sensors and can be applied to an external force detecting device such as a six-axis force sensor, but may also be applied to various devices which measure physical quantity to be detected based on displacement where the sensor structures each provide sensors in numbers different from three. Further, the optical displacement sensor structures may be applied for providing one optical displacement sensor where one light receiving element and one optical fiber are used together with one light source.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An optical displacement sensor structure comprising:
   a reference segment and a measurement segment;
   one light source disposed at one of the reference segment and the measurement segment;
   at least one light receiving element disposed at the other one of the reference segment and the measurement segment, at which no light source is disposed; and
   at least one optical fiber, which is wound to form a coil, wherein light emitted from the light source is introduced into the optical fiber from a circumferential surface of the optical fiber and exits out from an end face of one end portion of the optical fiber so as to proceed toward the light receiving element, whereby the light emitted from the light source is received by the light receiving element, and displacement of the measurement segment relative to the reference segment with regard to two axis directions in a plane perpendicular to an optical axis of the light emitted from the light source can be measured according to light receiving conditions.

2. An optical displacement sensor structure according to claim 1, wherein the light source is disposed to a central axis of the coil so that the light from the light source is introduced into the optical fiber from an inner circumference of the coil, and wherein the end face of the one end portion of the optical fiber is disposed so as to oppose the light receiving element.

3. An optical displacement sensor structure according to claim 2, wherein a lens to condense the light from the optical fiber on the light receiving element is disposed between the end face of the one end portion of the optical fiber and the light receiving element.

4. An optical displacement sensor structure according to claim 2, wherein the optical fiber is a multimode optical fiber.

5. An optical displacement sensor structure according to claim 2, wherein the coil has a circular cylinder configuration.

6. An optical displacement sensor structure according to claim 2, wherein the coil has a truncated circular cone configuration.

7. An optical displacement sensor structure according to claim 2, wherein the coil has a bowl configuration.

8. An optical displacement sensor structure according to claim 2, wherein a reflection element is disposed at an outer circumference of the coil.

9. An external force detecting device comprising an optical displacement sensor structure as described in claim 1, wherein an external force applied to the measurement segment is detected based on a signal resulting from measurement by the optical displacement sensor.

10. An external force detecting device according to claim 9, wherein the optical displacement sensor structure comprises a plurality of light receiving elements and a plurality of optical fibers together with the one light source commonly shared thereby providing a plurality of optical displacement sensors, and wherein two axis directions with respect to which each optical displacement sensor detects displacement are different from each other.

11. An optical displacement sensor structure according to claim 2, wherein the coil has a first curvature radius of r, and wherein the end portion of the optical fiber extending outward from the coil has a second curvature radius of R.

12. An optical displacement sensor structure according to claim 11, wherein R is approximately equal to 2r.

* * * * *